June 8, 1954   L. HAWORTH ET AL   2,680,634
SHAFT COUPLING
Filed Sept. 2, 1952   2 Sheets-Sheet 1
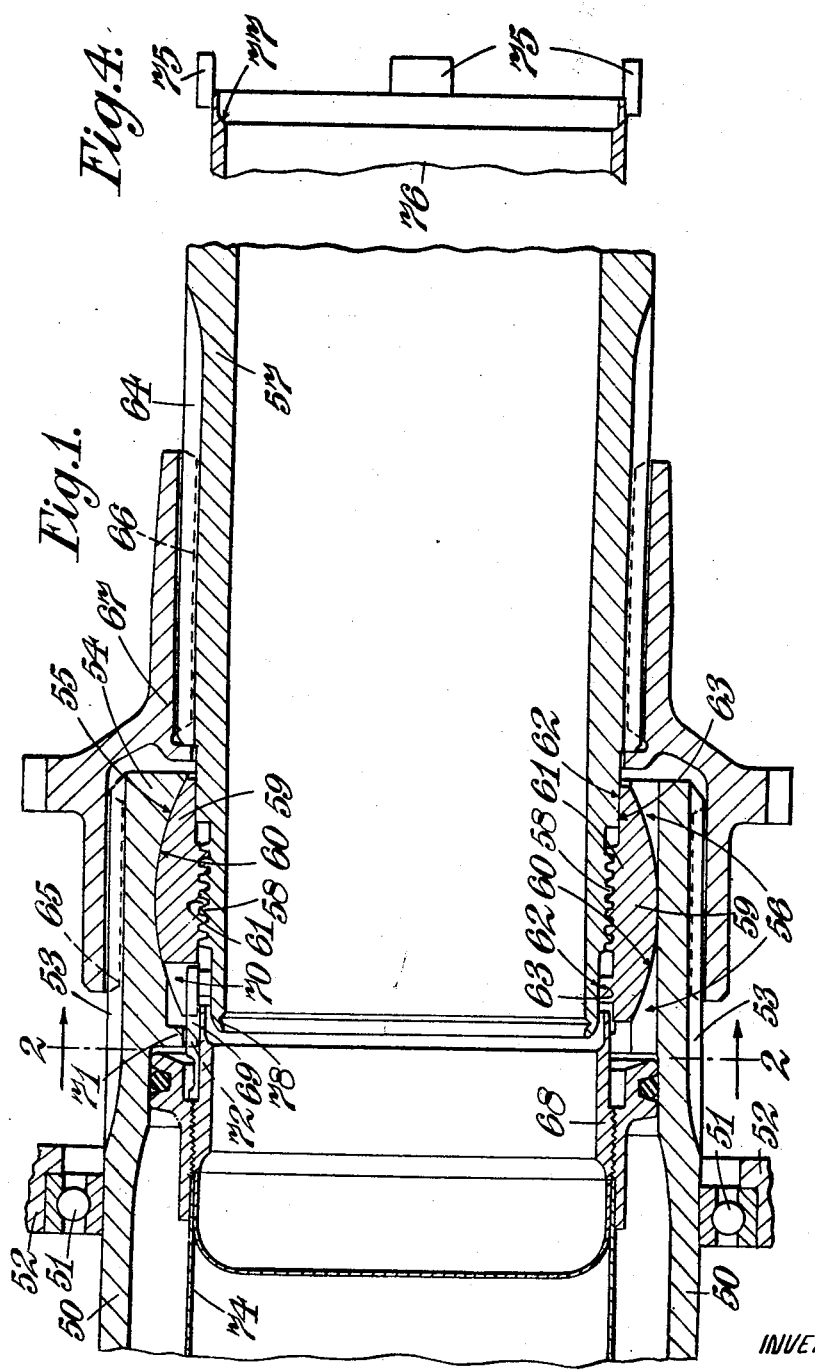
INVENTORS
L. HAWORTH &
P. G. BINNS
BY Wilkinson & Mawhinney
ATTYS.

June 8, 1954  L. HAWORTH ET AL  2,680,634
SHAFT COUPLING
Filed Sept. 2, 1952  2 Sheets-Sheet 2
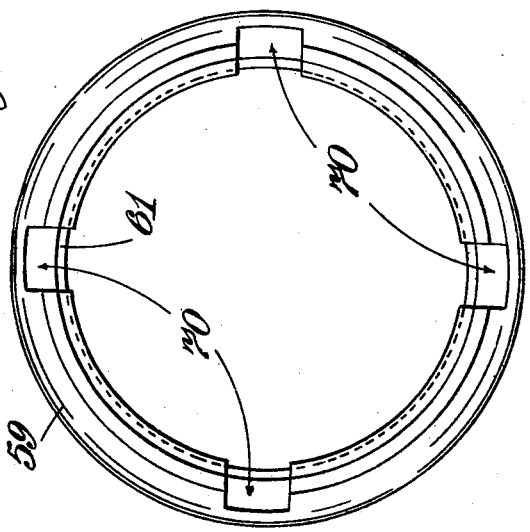
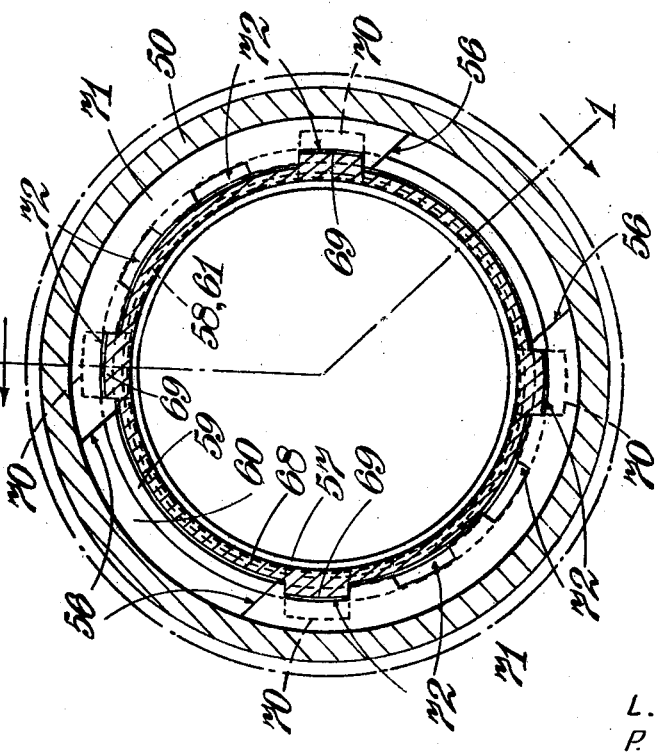
INVENTORS
L. HAWORTH &
P. G. BINNS
BY Wilkinson & Mawhinney
ATTYS.

Patented June 8, 1954

2,680,634

UNITED STATES PATENT OFFICE 2,680,634

SHAFT COUPLING

Lionel Haworth, Littleover, and Philip Gordon Binns, Mickleover, Derby, England, assignors to Rolls-Royce Limited, Derby, England, a British company Application September 2, 1952, Serial No. 307,408

Claims priority, application Great Britain July 9, 1952

5 Claims. (Cl. 287—58)

This invention relates to shaft couplings and has for an object to provide an improved construction of shaft coupling which in addition to transmitting torque between a pair of shafts and accommodating end thrusts between the shafts, permits axial adjustment of one shaft with respect to the other shaft.

According to the present invention, a shaft coupling comprises means rigid with one shaft and affording an annular recess having a part-spherical inwardly-facing surface coaxial with the shaft and having axially-spaced end walls, an annular member having an external part-spherical surface and accommodated in said recess with said external part-spherical surface co-operating with said inwardly-facing surface, said annular member being located axially in said recess when the coupling is operative, and said annular member having threaded engagement with a part rigid with the other shaft, readily-disengageable restraining means to restrain rotation of said annular member about the axis of one shaft, and a torque-transmitting member in torque transmitting engagement with both said shafts. The restraining means and the torque-transmitting member co-operates to prevent relative rotation of said annular member and said shafts when the coupling is operative, and the shafts are arranged for axial adjustment with respect to one another without disengagement of said torque-transmitting member from torque-transmitting engagement with either shaft, by disengaging the said restraining means and rotating the annular member on its thread whilst it is located axially in said recess.

In one preferred arrangement according to this invention, the restraining means to restrain rotation of the annular member within said recess comprises a ring member having axially-extending spline-like features thereon to co-operate with corresponding features on the annular member and on the shaft part in which said recess is formed. In order to effect adjustment of the shafts axially with respect to one another, the ring member is withdrawn axially to disengage the splines and a tool having similar but shorter splines is inserted to engage the splines in the annular member (but not those on the shaft part) and to rotate the annular member relative to both shafts.

Preferably the torque-transmitting member comprises a sleeve having two sets of internal splines, one of which sets engages the corresponding splines on one shaft or a part secured to it, and the other set of which engages with corresponding splines on the second shaft.

One embodiment of shaft coupling according to this invention will now be described as applied to coupling the compressor shaft of a gas turbine engine to a turbine shaft for driving the compressor. The description refers to the accompanying drawings, in which:

Figure 1 is an axial section through the coupling,

Figure 2 is a section on the line 2—2 of Figure 1,

Figure 3 is an end view of the annular externally-spherical member, and

Figure 4 illustrates part of a tool suitable for rotating the annular externally-spherical member on the threaded end of the turbine shaft.

Referring to the drawings, the compressor shaft (not shown) has bolted to it adjacent the outlet end of the compressor rotor a hollow stub shaft 50 and the stub shaft may be of stepped form and be arranged to carry elements of labyrinth seals. The shaft 50 carries a centre bearing 51 for supporting the compressor/turbine rotor assembly in stationary structure 52 intermediate the compressor and turbine rotors.

The stub shaft 50 at its end remote from the compressor is provided with external splines 53 the purpose of which will be described below.

This end of the stub shaft is also radially thickened internally as indicated at 54 and the radially thickened portion 54 is machined to afford an annular recess coaxial with the shaft, the surface 55 of which recess is in the form of an equatorial zone of a sphere. The radially thickened portion 54 is also cut away internally as by broaching to form a pair of diametrically opposite slots 56 each of which leads axially into the recess through the walls thereof. The slots 56 each have a width equal to the maximum chordal dimension of the part-spherical surface 55 taken in a direction parallel to the shaft axis.

The turbine shaft 57 has at its end a portion of reduced diameter which portion is provided externally with a screw-thread 58 and engaged with the screw thread there is an annular member 59 the external surface 60 of which is an equatorial zone of a sphere of such diameter as to fit within the recess in the radially thickened end portion 54 of the stub shaft 50.

The recess having the spherical surface 55 and the annular member 59 in effect afford a ball-and-socket connection between the ends of the shafts 50, 57 to be connected and act to transmit end thrusts between the shafts.

The annular externally-spherical member 59 is entered into the stub shaft 50 by presenting the annular member 59 to the slots 56 through the walls of the recess whilst the axis of the annular member 59 is at right angles to the shaft axis, passing the annular member 59 through slots 56 into the recess and then rotating the annular member 59 about an axis which is at right angles to both the shaft axis and its own axis, to bring it into a position coaxial with the stub shaft 50, in which position the annular member 59 is properly engaged in the recess having the spherical surface 55. The thread 58 of the turbine shaft can then be engaged with a thread 61 in the bore of the annular member 59.

The turbine shaft 57 is provided at each end of the thread 58 thereon with a cylindrical locating surface 62 and corresponding surfaces 63 are accurately machined internally of the annular externally-spherical member 59, so that the annular member 59 is supported in accurate alignment with the turbine shaft 57 by engagement of the surfaces 62, 63.

The turbine shaft 57 is formed externally at a location axially beyond the thread 58 and on the side of the thread 58 remote from the compressor with a series of axially-directed splines 64. The splines 64 and the external splines 53 on the end of the stub shaft 50 are engaged by corresponding sets of splines 65, 66 formed internally of a sleeve 67 embracing the ends of the stub shaft 50 and turbine shaft 57. The sleeve 67 acts to transmit torque between the shafts 50, 57 and also prevents relative rotation of the shafts about their axes.

The annular member 59 is, when the coupling is operative, restrained against relative rotation about the shaft axis with respect to the shafts 50, 57 and for this purpose the following arrangement is provided.

A ring member 68 is provided to be accommodated within the stub shaft 50 and the ring member 68 is formed externally with four equi-angularly-spaced spline-like projections 69. The annular member 59 has cut in it at one end four corresponding slots 70 and the stub shaft 50 has formed internally of it a flange 71 having cut in it eight similar slots 72 arranged in two diametrically-opposed sets of four slots each having their centre lines spaced 30° apart. The two sets are separated by the two slots 56 by which the annular member 59 is entered into the recess having the spherical surface 55.

The ring member 68 is inserted into the stub shaft 50 and when in position either two of the projections 69 or all four (depending on the angular position of the annular member 59 with respect to the slots 56 in the stub shaft 50) engage both a slot 70 in the annular member 59 and an aligned slot 72 in the internal flange 71 on the stub shaft 50, thus restraining rotation of the annular member 59 with respect to the shafts 50, 57. When only two projections 69 are so engaged, the remaining two engage slots 70 which are in line with the slot 56. Conveniently the ring member 68 has a threaded extension 73 by which it is secured to elongated parts 74 forming an air seal within the stub shaft 50 for closing-off the passage through the stub shaft 50, and may thus be readily accessible from the front end of the hollow compressor shaft.

To adjust the shafts 50, 57 axially with respect to one another the air seal parts 74 and ring member 68 are withdrawn axially from the stub shaft 50 thus unlocking the annular member 59 from both shafts 50, 57, and a tool is inserted into the stub shaft 50 to engage the annular member 59 and rotate it with respect to both shafts 50, 57, thus displacing the one shaft axially with respect to the other, the two shafts being restrained against relative rotation by the splined sleeve 67 connecting them.

The tool (Figure 4) conveniently comprises four projections 75 axially beyond the end of a sleeve 76, which projections 75 have an axial length sufficient to be engaged within the slots 70 in the annular member 59 without at the same time engaging in the slots 72 in the flange 71. The sleeve 76 may have its end adjacent the projections recessed as indicated at 77 to provide a curved inwardly-facing seating which engages a rounded end portion 78 of the turbine shaft 57 so that the tool may be readily located with respect to the end of the shaft.

It will be appreciated that a tool as just described cannot be withdrawn from engagement with the annular member 59 unless the slots 70 in the annular member 59 are properly aligned with slots 72 in the internal flange 71 of the stub shaft 50. In this way the insertion of the locking member 68 is facilitated.

We claim:

1. A shaft coupling comprising means rigid with one shaft and affording an annular recess having a part-spherical inwardly-facing surface coaxial with the shaft and having axially-spaced end walls, an annular member having an external part-spherical surface and accommodated in said recess with said external part-spherical surface co-operating with said inwardly-facing surface, said annular member being located axially in said recess when the coupling is operative, a part rigid with the other shaft and having threaded engagement with said annular member, readily-disengageable restraining means to restrain rotation of said annular member with respect to one shaft about the axis of said one shaft, and a torque-transmitting member in torque transmitting engagement with both said shafts.

2. A shaft coupling as claimed in claim 1, wherein the restraining means comprises a ring member having axially-extending spline-like features thereon, and wherein there are provided corresponding spline-like features on said annular member and on the said means in which said recess is formed, and adapted to co-operate with the spline-like features on the ring member.

3. A shaft coupling as claimed in claim 2, wherein the torque-transmitting member comprises a sleeve having two sets of internal splines, external splines on a part rigid with one shaft engaging one of said two sets of splines, and external splines on a part rigid with the other shaft and engaging the second of the two sets of internal splines.

4. A shaft coupling as claimed in claim 1, wherein the torque-transmitting member comprises a sleeve having two sets of internal splines, external splines on a part rigid with one shaft engaging one of said two sets of splines and external splines on a part rigid with the other shaft and engaging the second of the two sets of internal splines.

5. A shaft coupling between two coaxial shafts comprising means rigid with the first shaft and affording an annular recess having a part-spherical inwardly-facing surface coaxial with the shaft and having axially-spaced end walls, an annular member having an external part-spherical surface, having an internally-threaded bore and being accommodated in said recess with said external part-spherical surface co-operating with said inwardly-facing surface when the coupling is operative, whereby said annular member is prevented from axial movement in said recess, means rigid with the second shaft and having an externally-threaded portion in engagement with said internally-threaded bore, readily-disengageable restraining means to restrain rotation about the common axis of the shafts of said annular member in said recess with respect to said first shaft, said restraining means being engaged with said annular member and with said one of said shafts and extending through said first shaft to be accessible from the other end of said first shaft, a part rigid with each of said coaxial shafts, and a torque-transmitting member in torque-transmitting engagement with both the parts rigid with the coaxial shafts.

No references cited.